United States Patent
Catania et al.

(10) Patent No.: US 9,663,113 B2
(45) Date of Patent: May 30, 2017

(54) INTEGRATED VEHICLE MONITORING AND CONTROL

(71) Applicants: Joseph Catania, Tuckahoe, NY (US); Vito Catania, Tuckahoe, NY (US)

(72) Inventors: Joseph Catania, Tuckahoe, NY (US); Vito Catania, Tuckahoe, NY (US)

(73) Assignee: PrevenText LLC, Tuckahoe, NY (US)

( * ) Notice: Subject to any disclaimer, the term of this patent is extended or adjusted under 35 U.S.C. 154(b) by 0 days.

(21) Appl. No.: 14/876,198

(22) Filed: Oct. 6, 2015

(65) Prior Publication Data

US 2016/0096530 A1    Apr. 7, 2016

Related U.S. Application Data

(60) Provisional application No. 62/060,056, filed on Oct. 6, 2014.

(51) Int. Cl.

| | |
|---|---|
| *B60W 40/08* | (2012.01) |
| *B60R 16/02* | (2006.01) |
| *B60W 10/04* | (2006.01) |
| *B60W 10/30* | (2006.01) |
| *H04M 1/60* | (2006.01) |

(52) U.S. Cl.
CPC .......... *B60W 40/08* (2013.01); *B60W 10/04* (2013.01); *B60W 10/30* (2013.01); *H04M 1/6075* (2013.01); *B60W 2040/0809* (2013.01); *B60W 2540/28* (2013.01); *B60W 2710/30* (2013.01); *B60W 2720/10* (2013.01)

(58) Field of Classification Search
CPC ...... B60W 40/08; B60R 25/246; B60R 16/02; B60R 16/037; B60R 25/24; B60R 25/04; B60R 25/252; G06Q 40/08; G08G 1/20; H04W 4/008; H04M 1/667
USPC .................................. 701/36, 99; 340/5.72
See application file for complete search history.

(56) References Cited

U.S. PATENT DOCUMENTS

| | | | |
|---|---|---|---|
| 5,604,384 A * | 2/1997 | Carlo .................... | B60R 25/045 180/287 |
| 6,073,062 A * | 6/2000 | Hoshino ................. | B60R 25/04 340/426.22 |
| 6,225,897 B1 | 5/2001 | Doyle et al. | |

(Continued)

FOREIGN PATENT DOCUMENTS

ES          2358704          5/2011

*Primary Examiner* — Yuri Kan
(74) *Attorney, Agent, or Firm* — Frost Brown Todd LLC (57) ABSTRACT

The disclosed system discourages drivers from manual use of mobile personal communications devices while operating a vehicle. Software installed on the mobile device uses the mobile device itself to determine whether the device is being used during operation of the vehicle. The system uses vehicle equipment for alerts that notify passengers as well as others outside the vehicle (such as owners, parents, other drivers, pedestrians, law enforcement agencies) that the driver is operating the vehicle while distracted by a communications device, and as such, may be operating the vehicle in an unsafe manner. The system can use a mobile device running a security app as a required or alternative entry and ignition key. A web portal enables remote control of the vehicle's systems and limitations on its operation in the presence of a particular device, even disassociating the vehicle from a particular mobile device, and provisioning of a replacement device.

19 Claims, 6 Drawing Sheets

(56) References Cited

U.S. PATENT DOCUMENTS

| | | | |
|---|---|---|---|
| 7,077,549 B1 | 7/2006 | Corliss | |
| 7,541,914 B2 | 6/2009 | Breiner | |
| 7,734,315 B2 | 6/2010 | Rathus et al. | |
| 8,060,150 B2 | 11/2011 | Mendenhall et al. | |
| 8,154,393 B2 | 4/2012 | Breiner | |
| 8,461,973 B2 | 6/2013 | Reed et al. | |
| 2001/0050614 A1 | 12/2001 | Yang | |
| 2004/0066092 A1* | 4/2004 | Muller | B60R 25/24 307/10.1 |
| 2006/0255660 A1* | 11/2006 | Nakashima | B60R 25/24 307/10.4 |
| 2009/0153296 A1* | 6/2009 | LeGasse | B60R 25/246 340/5.72 |
| 2010/0148920 A1 | 6/2010 | Philmon et al. | |
| 2011/0070930 A1* | 3/2011 | Pothul | H04M 1/667 455/575.9 |
| 2013/0151111 A1* | 6/2013 | Skelton | B60R 16/02 701/99 |
| 2013/0238167 A1* | 9/2013 | Stanfield | G08G 1/20 701/2 |
| 2014/0002237 A1* | 1/2014 | Infante | B60R 25/252 340/5.32 |
| 2014/0080543 A1 | 3/2014 | Mueller et al. | |
| 2015/0025917 A1* | 1/2015 | Stempora | G06Q 40/08 705/4 |
| 2015/0149042 A1* | 5/2015 | Cooper | B60R 16/037 701/48 |
| 2015/0230042 A1* | 8/2015 | McGuire | H04W 4/008 455/418 |

\* cited by examiner

INTEGRATED VEHICLE MONITORING AND CONTROL

REFERENCE TO RELATED APPLICATION

This application claims priority to and is a nonprovisional of U.S. Provisional Patent Application No. 62/060,056, filed on Oct. 6, 2014, with title INTEGRATED VEHICLE MONITORING AND CONTROL SYSTEM BY SMARTPHONE.

FIELD

The present disclosure relates to circuits and systems for monitoring and control of vehicle systems and sensors using or as a function of the presence of a personal communication device and/or app.

BACKGROUND

The dangers of drivers sending text messages or otherwise manually operating mobile telephones, smartphones, or other personal communication devices (generically, Personal Communication Devices ("PCDs") herein) while driving are well understood, yet the behavior continues. According to the US Department of Transportation, in 2014, distracted driving caused 1,566,000 collisions, 500,000 injuries, and 6,000 deaths in the United States. Improved techniques for discouraging attention-impaired driving and/or reducing the risk associated therewith are needed. Likewise, parental management of distracted vehicle use by young drivers and fleet company management of distracted vehicle use by employees is awkward and uninformative at best, and sometimes impossible. Improved techniques for managing distracted vehicle use are also needed.

SUMMARY

Some embodiments of the disclosed system integrate a PCD and a vehicle, thereby allowing monitoring of driver activity and providing audible and visible warnings to passengers and external observers that a distracted driver might be operating the vehicle. In some embodiments, the system does not restrict the operation or use of PCDs by vehicle passengers accompanying the driver, provided that a passenger is seated in the front passenger compartment. In some embodiments, the system also provides for one or more specific PCDs to act as "parallel" and/or "serial" vehicle keys. Some embodiments use a physical key device as a "valet key" that allows limited operation of the vehicle. Various other embodiments of the disclosed, integrated system are intended to reduce the incidence of distracted motor vehicle operation and thereby reduce accidents and injury caused by distracted driving.

DESCRIPTION

For the purpose of promoting an understanding of the principles of the present invention, reference will now be made to the embodiments illustrated in the drawings, and specific language will be used to describe the same. It will, nevertheless, be understood that no limitation of the scope of the invention is thereby intended; any alterations and further modifications of the described or illustrated embodiments, and any further applications of the principles of the invention as illustrated therein, are contemplated as would normally occur to one skilled in the art.

Generally, one form of the present system is an integrated PCD-vehicle monitoring and control system that uses vehicle systems to discourage use of the PCDs features while driving and/or to enforce certain limits on operation of the vehicle. An interlock (e.g., a control connection between the PCD and the vehicle's ignition system) connects with operational systems of the vehicle and modifies their operation as a function of the operational state of the vehicle, a key, the PCD, and/or inputs thereto.

Figure 1:
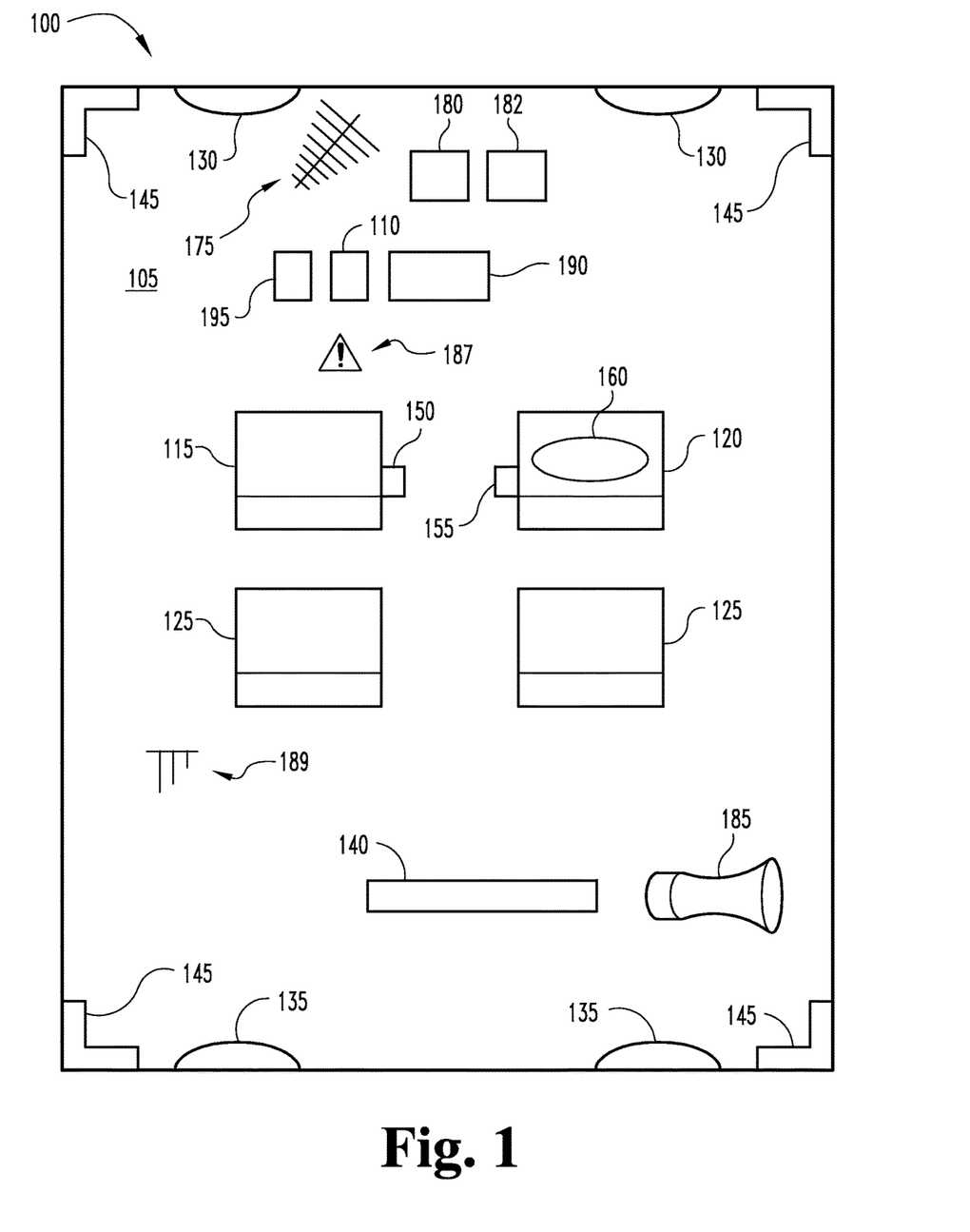
FIG. 1 is a top cutaway schematic view of a vehicle with a PCD use alert system according to one embodiment of the present disclosure.

With reference to FIG. 1, example system 100 includes vehicle 105 and PCD 110. As is well understood in the art, vehicle 105 includes driver's seat 115, passenger's seat 120, and rear seats 125, headlights 130, taillights 135, "Cyclops" taillight 140, and corner/warning lights 145. Additional standard or optional devices and sensors, such as those associated with seat belt buckles 150 and 155, passenger seat occupant sensor 160, Bluetooth antenna 175, engine control microprocessor (ECM) 180, memory 182, alarm sound generator 185, chime generator 187, dashboard indicator 189, and display 190 are included as would occur to those skilled in the art.

Figure 2:
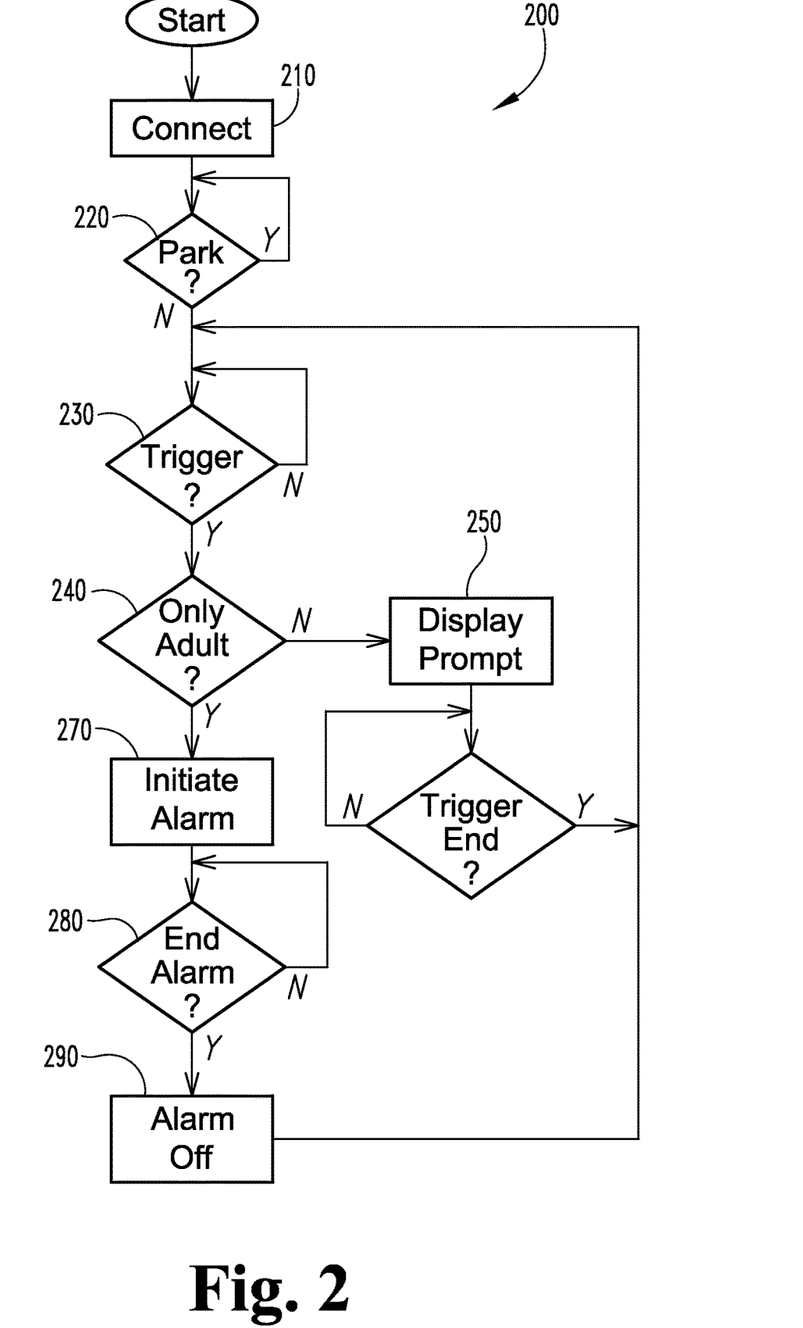
FIG. 2 is a flowchart illustrating the sequence of operation of the embodiment of FIG. 1.

Operation of the illustrated system will now be described with reference to FIG. 2 and continuing reference to FIG. 1. At the beginning of example process 200, ECM 180 detects the presence of PCD 110 in or near vehicle 105, identifies PCD 110, and creates (210) a data connection therewith, such as via Bluetooth antenna 175. In other embodiments, alternative data connection techniques are used, such as wired or wireless USB, near-field communications (NFC), or other techniques as will occur to those skilled in the art.

The system 100 then monitors the transmission of vehicle 105, such as whether the transmission is in "Park" (or, in some embodiments, either in "Park" or "Neutral") (220). If so (a positive result at conditional block 220), the system continues this monitoring. When vehicle 105 is shifted out of Park (a negative result at conditional block 220), system 100 begins to monitor (230) PCD 110 for trigger activity.

The system 100 then monitors operation of the PCD 110 and, if certain conditions (a "trigger activity") are met, generates an alert. In some embodiments, this monitoring is performed by an app, service, or other software running on PCD 110 that monitors its activity and communicates relevant aspects of it using available communications channels to ECM 180. In some embodiments, monitoring alternatively or additionally occurs at ECM 180 by monitoring traditional bus/interface communications. In still others, activity is monitored indirectly by detecting levels, location, direction, timing, and/or changes in the level of electromagnetic radiation emanating from sources within the passenger compartment of vehicle 105.

This monitoring continues as long as the system 100 waits for a trigger activity (230). When such an event is observed (positive result at conditional block 230), system 100 checks (240) whether the driver is the only adult riding in the front seat(s). This check uses, for example, a logical combination of outputs from one or more of passenger seat occupant sensor 160, a sensor in passenger seatbelt buckle 155, and other available sensors. If there is an adult passenger in the passenger seat (negative result at conditional block 240), system 100 suggests (250)—using one or more of the display of PCD 110, audio prompts played through the audio output of PCD 110 or the cabin of vehicle 105, or another available visual or audio interface, such as display 190 built into vehicle 105—that the other adult complete the activity. (In some implementations, when a person is present in the front passenger-side seat, the monitoring alert aspects of the system are disabled. In some others, trigger actions yield an audio and/or visual announcement to avoid driver distraction. In still others, the presence or absence of a person in the front passenger-side seat has no effect on system 100.) The system waits (260) for the trigger activity to end, then goes back to monitoring for trigger activity. In some embodiments, the announcements, prompts, and/or alerts continue throughout the duration of the trigger activity, while in others, they stop after a period of time.

If the driver is the only adult in the front seat (a positive result at conditional block 240), the system 100 initiates an alarm (270). In various embodiments, the alarm action includes one or more of:

engaging the vehicle's flashing "hazard" lights (145);
engaging the audible chime 187 in the passenger compartment, such as one that is also used to indicate an unfastened seatbelt;
turn on the interior "cabin light," "dome light," dashboard light and/or other indicator 189, or other interior lighting;
intermittently sound the vehicle's horn or external alarm sound generator 185;
store the date, time, and trigger information for collection and reporting;
send a notification of the trigger to law enforcement authorities, insurance companies, parents, fleet managers, or other interested parties; and
send notification of the presence of a distracted driver to other users of the same or similar systems who are in the geographical vicinity of vehicle 105.

System 100 then waits (280) for the conditions to occur when it should cease the alarm action(s). In various embodiments, this may be the passage of a particular amount of time (for example, 10 minutes) from triggering of the alarm, the passage of a certain amount of time after the last trigger behavior, the vehicle 105 coming to a complete stop with the transmission in "Park" (or, in some embodiments, either in "Park" or "Neutral") and/or the ignition off (perhaps also requiring passage of a particular amount of time, such as 1-5 minutes), or some combination of two or more conditions combined using Boolean or other programmatic logic, as will occur to those skilled in the art. When the conditions for ending the alarm occur (a "yes" result at conditional block 280), the alarm is turned off (290), and the system returns to monitoring (230) for a trigger event.

The monitoring of PCD 110 is implemented in this embodiment using a software application running on the processor of the PCD, which in the present embodiment comprises a computing device (see below). In this embodiment, the software application registers listeners with the device's operating system to get (internal, automatic, electronic) notices when the user receives, composes, and/or sends a text message, places a phone call, operates email or a chat application, actuates a physical or virtual button, interacts with an activated touchscreen, or otherwise uses the device in any other way. In other embodiments, more, fewer, or different activities are monitored. When the application receives notice of such activity from the operating system, it communicates data describing the activity to ECM 180, which initiates an alarm.

The illustrated embodiment also detects whether the vehicle operator is the sole adult in the front of the vehicle and in possession of the PCD 110. It uses passenger seat occupant sensor 160 to determine whether a second adult is present in the front, passenger-side seat(s). If so, in some embodiments, the alarm functionality is disabled. In others, when a passenger is detected by the passenger seat occupant sensor 160, ECM 180 plays an audio prompt, engages a chime (as when a seat belt is unfastened though a passenger is detected), and/or displays a message on the PCD 110 or display 190 suggesting that the driver ask a passenger to complete the activity. If no second adult is present, and if the driver proceeds to use the PCD 110 in spite of the warning, the alarm proceeds.

While the present description is being given in terms of certain components of the system taking certain actions, sending signals, and initiating notices, those skilled in the art will appreciate that variations of signal initiation and flow can implement various embodiments without undue experimentation. For example, the system may be implemented using an aftermarket processor to implement all of the steps, using a standard external interface (e.g., Controller Area Network (CAN), OBD II, etc.) to the original equipment manufacturer's system to collect relevant sensor data and take responsive actions through other vehicle systems. In some embodiments, part of the processing is done by one or more processors built into the vehicle's original systems, with other portions of the processing occurring in an external processor. And in some embodiments, all of the vehicle-side processing occurs in original equipment.

In some embodiments, information about trigger events is recorded in a memory associated with ECM 180, including, as an example, the type of communication detected, GPS location of the vehicle at that time, sensor readings, date, and time. This data is then made available to the owner of the vehicle (such as a parent), corporate owner, fleet operator, governmental agency or entity, insurance company, law enforcement agency, or operator of a toll road or throughway on which the vehicle was operating at the time of infraction, such as through the EZ-Pass system. In some of these systems, payment of a fine for the infraction is automatically paid through the associated payment relationship between the driver/vehicle owner and the insurance company, fleet operator, or toll road operator or authority.

In some embodiments, the app on the PCD 110 functions as a key for access to and operation of vehicle 105. In these embodiments, if the app is not operating to correctly report the status of PCD 110, vehicle 105 refuses to operate or, in a variation, refuses to perform certain functions. On the other hand, when PCD 110 is running the app in the proximity of vehicle 105, the app can be used to start its ignition, lock doors, adjust climate control options, control the audio system, and take other actions as will occur to those skilled in the art. In a variation of this embodiment, a wireless data connection between vehicle 105 and a data center connects a web portal to the integrated control system on vehicle 105, enabling authenticated users to control various systems of vehicle 105 via a website or remote app. In a particularly useful variation, the website or remote app is able to dynamically de-authorize PCD 110 and authorize a new device to serve as PCD 110 in the event that the existing PCD 110 is lost or stolen.

Figure 3:
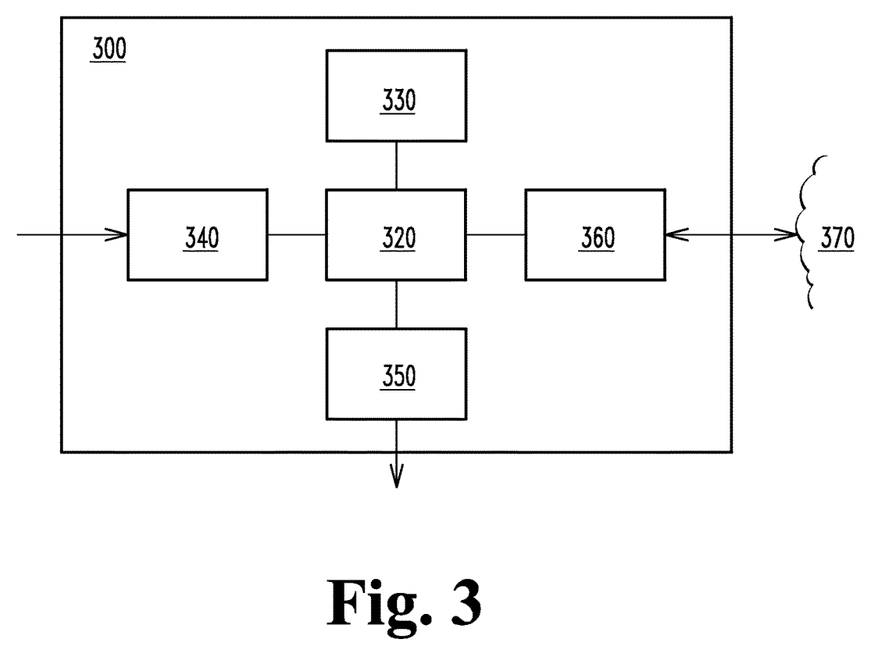
FIG. 3 is a schematic diagram of a computing device for use in various roles in the disclosed systems.

In some embodiments of the systems described herein, the computing resources/devices that are applied generally take the form of a mobile, laptop, desktop, or server-type computer, as mentioned above and as will occur to those skilled in the art. With reference to FIG. 3, the "computer" 300 (as this example will generically be referred to) includes a processor 320 in communication with a memory 330, input interface(s) 340, output interface(s) 350, and network interface 360. Memory 330 stores a variety of data, but is also encoded with programming instructions executable to perform the functions described herein. Power, ground, clock, and other signals and circuitry (not shown) are used as appropriate as will be understood and easily implemented by those skilled in the art.

The network interface 360 connects the computer 300 to a data network 370 for communication of data between the computer 300 and other devices attached to the network 370. Input interface(s) 340 manage communication between the processor 320 and one or more touch screens, sensors, pushbuttons, UARTs, IR and/or RF receivers or transceivers, decoders, or other devices, as well as traditional keyboard and mouse devices. Output interface(s) 350 provide signals to one or more output devices (not shown) such as LEDs, LCDs, or audio output devices, local multimedia devices, local notification devices, or a combination of these and other output devices and techniques as will occur to those skilled in the art.

The processor 320 in some embodiments is a microcontroller or general purpose microprocessor that reads its program from the memory 330. The processor 320 may be comprised of one or more components configured as a single unit. Alternatively, when of a multi-component form, the processor may have one or more components located remotely relative to the others. One or more components of the processor may be of the electronic variety including digital circuitry, analog circuitry, or both. In some embodiments, the processor is of a conventional, integrated circuit microprocessor arrangement, such as one or more CORE i3, i5, or i7 processors from INTEL Corporation of 2200 Mission College Boulevard, Santa Clara, Calif. 95052, USA, or OPTERON or PHENOM processors from Advanced Micro Devices, One AMD Place, Sunnyvale, Calif. 94088, USA, while in others nontraditional or innovative data processing technology is used. In alternative embodiments, one or more reduced instruction set computer (RISC) processors, graphics processing units (GPU), application-specific integrated circuits (ASICs), general-purpose microprocessors, programmable logic arrays, or other devices may be used alone or in combinations as will occur to those skilled in the art.

Likewise, the memory 330 in various embodiments includes one or more types such as solid-state electronic memory, magnetic memory, or optical memory, just to name a few. By way of non-limiting example, the memory 330 can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; a solid-state or hybrid drive; or a plurality and/or combination of these memory types. Also, the memory in various embodiments is volatile, nonvolatile, or a hybrid combination of volatile and nonvolatile varieties.

Computer programs implementing the methods described herein will commonly be stored and/or distributed either on a physical distribution medium such as CD-ROM or pluggable memory module (for example, a flash memory device with a USB interface), or via a network distribution medium such as an internet protocol and/or cellular data network, using other media, or through some combination of such distribution media. From there, they will in some embodiments be copied to a hard disk, non-volatile memory, or a similar intermediate storage medium. When the programs are to be run, they are loaded either from their distribution medium or their intermediate storage medium into the execution memory of the computer, configuring the computer to act in accordance with the methods described herein. All of these operations are well known to those skilled in the art of computer systems.

The term "computer-readable medium" herein encompasses non-transitory distribution media, intermediate storage media, execution memory of a computer, and any other medium or device capable of storing a computer program implementing a method for later reading by a computer.

Figure 4:
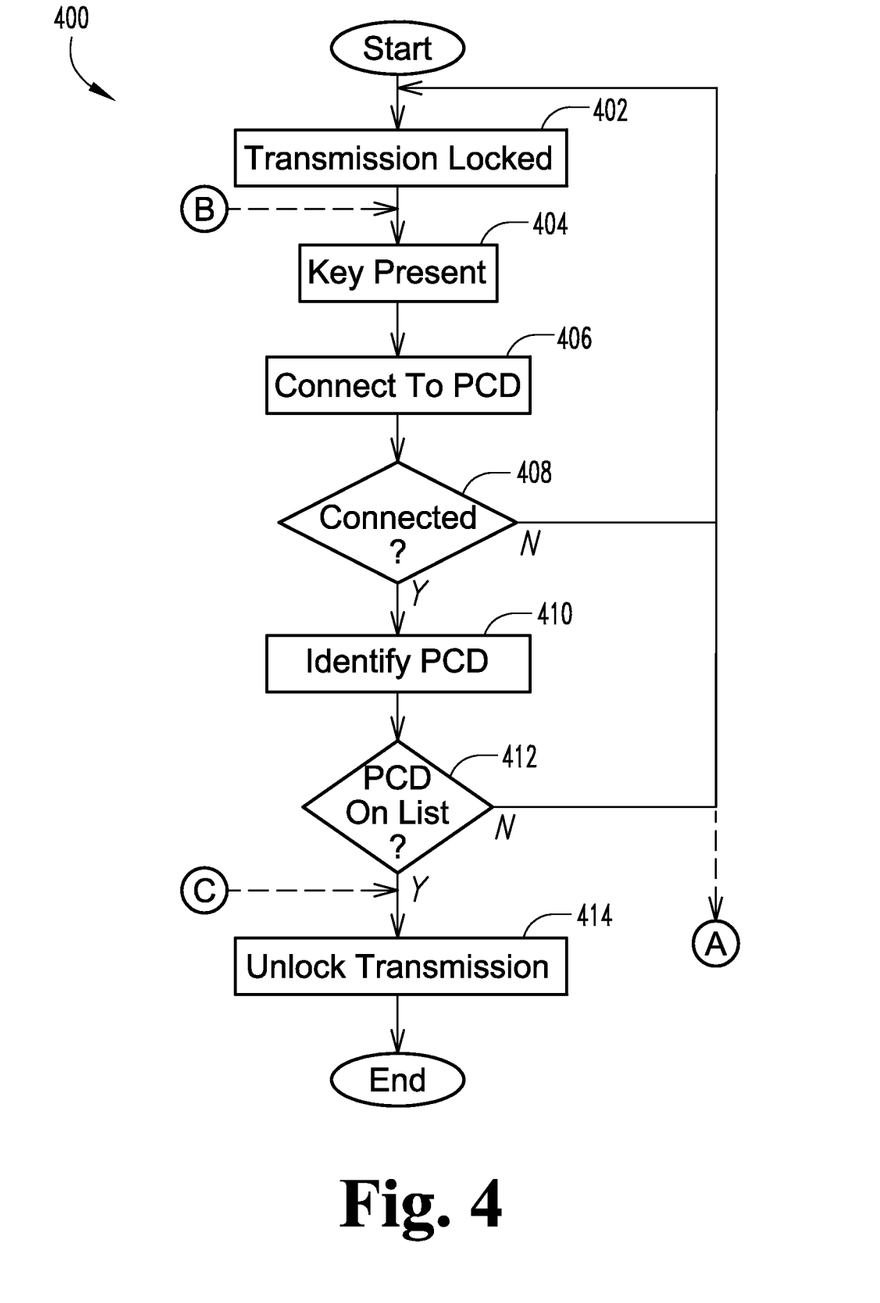
FIG. 4 is a flowchart illustrating a sequence of operation of a PCD-vehicle interlock according to the present disclosure.

In some embodiments, which will be discussed with reference to FIGS. 4 and 5 and with continuing reference to FIG. 1, PCD 110 operates as a "serial key" to traditional key 195 that is made available to certain drivers. (That is, both traditional key 195 and PCD 110 are required for operation of vehicle 105.) Following process 400, the engine of vehicle 105 will only start in response to presentation of key 195 if the vehicle is in communication with (or can promptly establish communication with) one or more particular PCD's 110. Exemplary process 400 begins with the transmission of vehicle 105 locked (402) in a "Park" (or, in some embodiments, either "Park" or "Neutral") state. In various alternative embodiments, the vehicle's engine is also off, while in others, other features and functionality of vehicle 105 are disabled.

ECM 180 receives (404) an indication of the presence of key 195. In various embodiments, this indication includes physical insertion of key 195 into a traditional three-position ignition switch, proximity detection of a fob with a Bluetooth transceiver via Bluetooth or Bluetooth LE, NFC data exchange, RF communications, or other techniques as will occur to those skilled in the art, and key (or "physical key device") 195 has a corresponding form.

Upon receiving that indication of the presence of key 195, ECM 180 attempts (406) to establish a data connection with a nearby PCD 110. In some embodiments, this connection attempt occurs by way of Bluetooth protocols, wired or wireless USB, Wi-Fi, or other connection protocol as will occur to those skilled in the art. If the connection attempt is successful ("yes" at decision block 408), ECM 180 uses the data connection to attempt to identify (410) PCD; that is, ECM 180 reads/receives an identifier, engages in a challenge-response or other cryptographic authentication process, or otherwise determines the identity of PCD 110 using techniques that will occur to those skilled in the art. In some embodiments, this identification of PCD 110 will occur as part of the process of establishing a data connection, while in others it will be done separately.

In some such embodiments, a unique identifier for the presented PCD (which might be a MAC address, Bluetooth device ID, IMEI number, encrypted authentication data, or other identifier as will occur to those skilled in the art) is communicated to ECM 180 to confirm that the particular phone is present. In some of these embodiments, the identifier is compared (412) with a list of identifiers previously stored in memory 182. Some embodiments store this list when the system 100 is installed (such as at the factory or dealership or by an aftermarket installer), while the vehicle owner has the ability to maintain the list by way of a website, application, or through the vehicle display 190.

If the identifier for PCD 110 is on the list of acceptable devices (positive result at decision block 412), ECM 180 unlocks (414) the transmission (or enables the vehicle 105 to start, or otherwise enables functionality or operation that was initially limited at (402)). On the other hand, if the identifier for PCD 110 is not on the list (negative result at decision block 412), or if the attempted connection to a PCD 110 failed (negative result at decision block 408), process 400 returns to waiting for a key (and does not enable [full] operation of the vehicle 105).

In a variation on these embodiments, process 400 operates in a special "valet key" mode and/or allows override using a passcode in the absence of an approved PCD 110. In these embodiments, upon a negative result's decision block 408 or decision block 412, process 400 turns to subprocess 420, shown in FIG. 5, (at connection point A) before returning to waiting for a key (via connection point B). Subprocess 420 in this embodiment begins by prompting (422) the driver using display 190 to proceed in "valet key" mode or for entry of a vehicle access passcode. If the user chooses to operate as a "valet key" (positive result at decision block 424), then system 100 imposes (426) limits on the vehicle's travel, including speed and distance limitations and other limitations as will occur to those skilled in the art. Violations of these limitations are logged and reported. Entertainment and built-in communication systems are turned off (428), and these limitations are preferably displayed (430) to the user on display device 190. In embodiments where vehicle 105 has an available data connection, the state, location, and operation of vehicle 105 while in "valet key" mode is communicated (442) to an owner's device (perhaps using the same app as identifies an authorized PCD 110) so the owner can monitor that operation substantially in real time. Process 400 then continues (via connection point C) by unlocking (414) the transmission and allowing (limited) vehicle operation.

If the user elects not to enter "valet key" mode (negative result at decision block 424) and decides to enter a passcode (positive result at decision block 432), system 100 accepts entry of a passcode (434) and compares (436) the entered passcode with one or more stored, authorized passcodes. If a match is found (positive result from decision block 438), use of the passcode is logged (440), and the user is guided (450) through the process of pairing PCD 110 with system 100 and adding PCD 110 to the list of acceptable devices (see above discussion regarding decision block 412) or otherwise managing that list. Process 400 continues (via connection point C) by unlocking the transmission (414). On the other hand, if the user elects not to enter a passcode (negative result at decision block 432) or the entered passcode is not on the list of authorized passcodes (negative result at decision block 438), process 400 returns (via connection point B) to waiting for presentation of the key at block 404.

In variations on these embodiments, entry of an acceptable passcode (positive result at decision block 438) gives the user the option of adding a new PCD 110 to the list of authorized devices. If that new PCD 110 is present and activated, the transmission may be unlocked (or other functionality enabled), and vehicle 105 continues as described above. If the user entered a correct passcode and does not want to add a new PCD 110, but needs to operate vehicle 105, system 100 prompts the user via display 190 to certify that no PCD 110 is in vehicle 105. In some implementations, in contrast with process 420 illustrated in FIG. 5, multiple passcode entry attempts are allowed before the vehicle turns off and removal of operational limitations is aborted. Passcode entry and valet mode operation are logged and reported.

Figure 6:
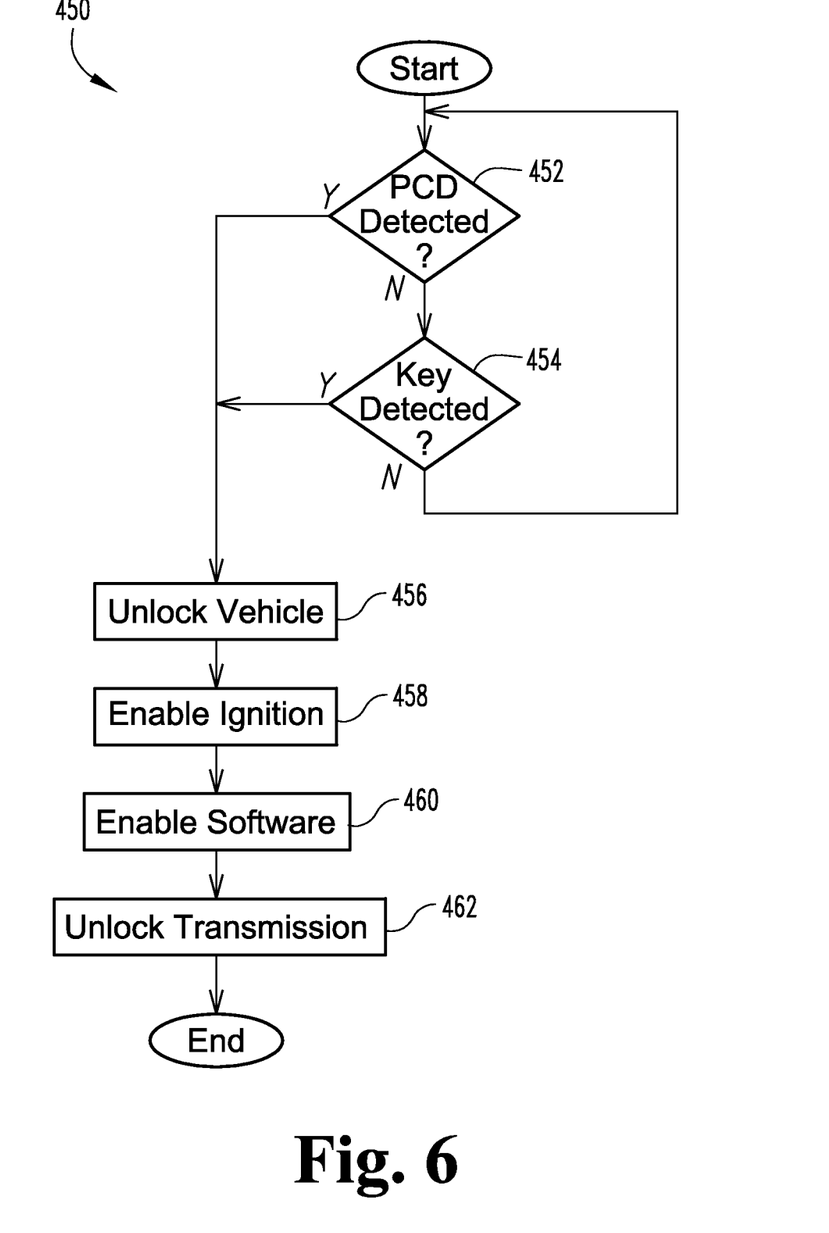
FIG. 6 is a flowchart illustrating the sequence of operation for a "parallel key" interlock according to the present disclosure.

Similarly, as will now be discussed with reference to FIG. 6 and continuing reference to FIG. 1, software on PCD 110 operates in some embodiments as a "parallel key" to traditional key 195. (That is, vehicle 105 is configured to operate using either PCD 110 or key 195 for operation.) In this process 450, vehicle 105 begins in the state of waiting to detect the presence of key 195 or PCD 110. (While this and other waiting and monitoring states described herein may be implemented using polling, interrupt, or other techniques as will occur to those skilled in the art, FIG. 6 illustrates the state as a tight conditional loop.) If ECM 180 does not connect to and identify a PCD 110 (negative result at decision block 452), ECM 180 determines whether a key 195 is present (as discussed above, though here illustrated only as decision block 454). If there is also no key 195 (negative result at decision block 454), process 450 continues its waiting.

If a PCD 110 is connected (positive result at decision block 452) or key 195 is detected, authenticated, and running appropriate software (positive result at decision block 454), the vehicle 105 is unlocked (456), and its ignition switch is enabled (458). Activity monitoring software is enabled (460) on PCD 110, and the transmission is unlocked (462).

Figure 5:
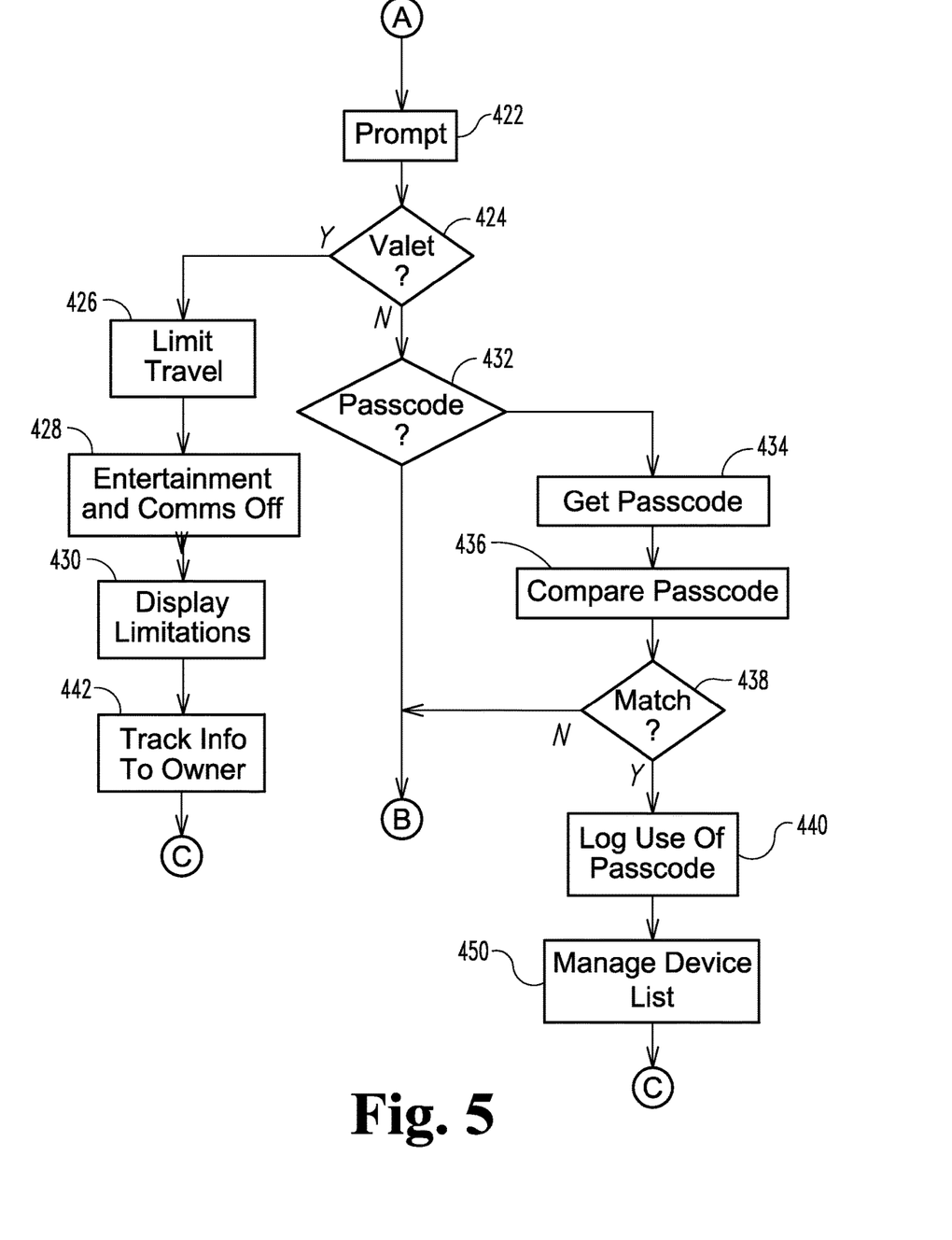
FIG. 5 is a flowchart illustrating an optional sequence of operation for valet key in connection with the sequence of operation in FIG. 4.

In some alternative embodiments, upon detection of a key 195 at decision block 454, system 100 operates in "valet key" mode as described herein together with a positive result at decision block 424 and blocks 426, 428, and 430 in FIG. 5.

Some embodiments are advantageously used to manage the vehicle use by minors, employees, fleet drivers, and the like. In these restricted-use embodiments, the driver's key 195 cannot operate vehicle 105 without an authenticated PCD 110 that is running associated software. Various parameters of operation of vehicle 105 are monitored, such as speed, location, radio volume, time of operation, location, seatbelt usage, and other parameters as will occur to those skilled in the art. In some implementations, all such data is logged and reported, while in others, data beyond certain limits is logged and reported. In some embodiments, one or more of these parameters are limited so that limits are imposed on settings (such as radio volume) or operation (such as starting the car after certain time) by leveraging the connection between the PCD 110 and ECM 180.

In some embodiments, PCD 110 periodically communicates information to ECM 180, confirming that the monitoring software (mentioned herein) is still operating and detecting no trigger events. If the software detects a trigger event, or if ECM 180 loses communication with PCD 110, or if the periodic signal is not received within a particular window of time, ECM 180 responds as to a trigger event (e.g., as described above). In some variations of these embodiments, ECM 180 only allows the vehicle's engine to be started if authenticated communication can be established with any of one or more previously approved PCD's 110. The list of approved PCD's 110 can be maintained by an interaction with display 190 that includes authentication using a particular pass code, an "owner" device, or other techniques as will occur to those skilled in the art.

In some variations of this embodiment, the app on PCD 110 is further operable to control systems of vehicle 105, such as starting the engine, locking or unlocking the doors, opening the trunk, triggering alarms, flashing or turning on lights, adjusting climate control, managing or controlling the entertainment or navigation systems, adjusting environmental controls, logging maintenance activities/schedules/diagnoses, enabling an engine block or fuel supply heater based on temperature sensors in the vehicle, and the like. In some implementations, the app on PCD 110 enables a navigation app also on PCD 110 to connect to and override a navigation system built into vehicle 105 so that the display 190 and other interface components of vehicle 105 operate as user interface devices for the navigation app. Some or all of the data collected by the app or by ECM 180 in communication (and communication attempts) with PCD 110 may be communicated to the vehicle owner (or fleet owner, insurance company, law enforcement agency, toll road operator, etc.) for accountability or other purposes. These communications (commands and data) proceed in some embodiments via a local data connection such as Bluetooth, Wi-Fi, USB, or other wired or wireless protocol as will occur to those skilled in the art), while in others they pass through a wireless wide-area network (such as the cellular data network and/or the Internet).

Similarly, settings for system 100 are managed in some embodiments by means of a website or other interface as will occur to those skilled in the art. Any relevant parameter of system 100, from the identities of authorized PCD's 110 to the speed and distance allowed under "valet key" operation and the like can be customized. For vehicles 105 that have persistent, long-range data connections (such as via cellular data networks), settings are communicated to ECM 180 either immediately, the next time the vehicle is powered on and connected to the network, or at some polling interval. Vehicles 105 that do not have such data connections leverage the data connections of PCD's 110 that connect to ECM 180 to download settings updates.

Throughout this description, various data elements are described as being collected, logged, and/or reported. In each case, various embodiments store those data elements in a memory (182, 330, etc.) that is part of one or more systems on vehicle 105, part of PCD 110, or elsewhere. The data may be periodically summarized as will occur to those skilled in the art. In various embodiments, the data or summary is transferred in real time, at regular intervals, and/or at opportune times when data connections (or inexpensive data connections, such as Wi-Fi or Bluetooth) are available. In various implementations, these transfers go to one or more drivers of vehicle 105, parents, fleet owners/operators, cloud computing servers, Internet sites, vehicle manufacturers, government agencies, insurance companies, banks, contractors, accountability partners, and other interested persons.

In variations of the embodiments described herein, ECM 180 (see FIG. 1) comprises a plurality of processors 320 (see FIG. 3), and the various actions by, connections with, and communications involving ECM 180 in those descriptions involve separate processing components that might or might not have anything to do with traditional "engine control" or traditional "ECM's."

The term "computer-readable medium" herein encompasses non-transitory distribution media, intermediate storage media, execution memory of a computer, and any other medium or device capable of storing a computer program implementing a method for later reading by a computer.

When an act is described herein as occurring "as a function of" something, the system is configured so that the act is performed in different ways depending on one or more characteristics of that thing.

In this description, and "identifier" means something that uniquely identifies a thing, and "identifying" means uniquely determining which among multiple possibilities a thing is.

In this description, a "personal communication device" (PCD) might be a smartphone, smart watch, tablet computer, Google Glass, or other individually usable device that has built-in data communication capabilities.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A personal communications device (PCD)-vehicle monitoring, warning, and reporting system for use in a motorized vehicle, the system comprising:
   a processor transported by a vehicle;
   a memory in communication with the processor, wherein the memory is encoded with programming instructions executable by the processor to:
      establish a data connection with a PCD, where the PCD has an identity;
      through the data connection, establish the identity of the PCD;
      communicate via the data connection to detect a trigger event and to trigger an alarm action by the programming instructions in response to the trigger event; and
      as a function of the identity of the PCD, selectively monitor and report on operation of the vehicle and use of the PCD without restricting use of the PCD.

2. The monitoring, warning, and reporting system of claim 1, wherein the system monitors and reports on events selected from an event class consisting of:
   operation of the vehicle outside certain ranges of speed;
   operation of the vehicle for longer than a certain distance;
   operation of the vehicle during certain hours;
   operation of the vehicle during certain hours on particular days;
   operation of the vehicle in one or more certain geographical areas; and
   operation of the vehicle outside one or more certain geographical areas.

3. The monitoring, warning, and reporting system of claim 1, further comprising a unique and specifically identifiable physical key device, wherein the system also selectively reports on operation of the vehicle as a function of whether the physical key device is present or absent.

4. The monitoring, warning, and reporting system of claim 1, further comprising software running on the PCD and communicating with the processor via the data connection to monitor and report on utilization of the PCD during one or more particular states of operation of the vehicle; and wherein the vehicle has a transmission, and the reporting is triggered by one or more of:
sending text messages; and
non-hands-free use of the PCD;
while the transmission is not in a "park" state.

5. The monitoring, warning, and reporting system of claim 1, wherein the trigger event comprises at least one of:
making a non-hands-free phone call using the PCD;
composing a text message on the PCD;
loading any app on the PCD;
opening or using any of one or more apps on the PCD;
pressing a button on the PCD; and
interacting with an activated display on the PCD; and
wherein the vehicle has an interior and an exterior, and the alarm action is selected from an action class consisting of:
sounding one or more tones within a passenger compartment of the vehicle;
playing an audio message within the passenger compartment of the vehicle;
flashing one or more lights within the passenger compartment of the vehicle;
illuminating one or more indicators within the passenger compartment of the vehicle;
flashing one or more indicators on the exterior of the vehicle;
illuminating one or more lights on the exterior of the vehicle; and sounding a horn on the vehicle.

6. The monitoring, warning, and reporting system of claim 5, wherein
the vehicle has one or more passenger sensors comprising at least one of a seat belt sensor and an airbag sensor, and
whether and when the programming executed by the processor triggers the alarm action is a function of output from the one or more passenger sensors.

7. The monitoring, warning, and reporting system of claim 1, further comprising an internet-accessible interface usable to perform one or more remote administration tasks from a set of administration tasks consisting of:
associating one or more PCD's with the system;
removing an existing association of one or more PCD's with the system;
listing PCD's associated with the system;
changing one or more aspects of the selective monitoring and reporting on operation of the vehicle;
changing one or more aspects of the selective monitoring and reporting on use of the PCD;
changing the trigger event;
changing the alarm action;
changing one or more settings relating to a system override; and changing one or more aspects of the reporting as a function of the identity of the PCD.

8. The monitoring, warning, and reporting system of claim 1, wherein the programming instructions are further executable by the processor to receive navigation information from the vehicle via the data connection and convey it to a vehicle owner or a third party through one or more of the PCD and built-in vehicle systems.

9. A personal communications device (PCD)-vehicle monitoring and control system for use in a motorized vehicle that has a transmission, the system comprising:
a processor transported by a vehicle;
a memory in communication with the processor, wherein the memory is encoded with:
identifying information with which to identify one or more PCD's, and
programming instructions;
wherein the programming instructions are executable by the processor to:
attempt to establish a data connection with a first PCD that is portable and used for communications over a wireless network the first PCD having an identity, the attempt occurring without substantially impeding physical access to the first PCD;
as a function of the identity of the first PCD, selectively monitor and report on operation of the vehicle and use of the first PCD without restricting use of the first PCD;
if the attempt to establish the data connection is unsuccessful, prevent engagement of the transmission; and
if the attempt to establish the data connection is successful, use the identifying information to determine whether the first PCD is among the one or more identified PCD's, and
if so, allow engagement of the transmission; and
if not, prevent engagement of the transmission.

10. The monitoring and control system of claim 9, wherein the programming instructions are further executable by the processor to:
allow engagement of the transmission, overriding the preventing, upon activation of a valet mode that limits operation of the vehicle.

11. The monitoring and control system of claim 10, where the limited operation of the vehicle comprises at least one of limiting a speed of the vehicle in valet mode and limiting a distance traveled in valet mode.

12. The monitoring and control system of claim 9, wherein the programming instructions are further executable by the processor to:
after establishment of the data connection, attempt to determine whether particular software is executing on the PCD;
as a function of a determination that the connected-to PCD is among the one or more identified PCD's, enable engagement of the transmission only if it is successfully determined that the particular software is executing on the PCD.

13. The monitoring and control system of claim 9, wherein:
the vehicle includes user interface hardware; and
the programming instructions are further executable by the processor to, accept input of a user passcode, and if the user passcode matches a predetermined override passcode, enable engagement of the transmission even if no PCD that is among the one or more identified PCD's is present.

14. The monitoring and control system of claim 9, wherein the programming instructions are further executable by the processor to receive navigation information from the PCD via the data connection and convey it to a driver of the vehicle using one or more built-in vehicle systems.

15. The monitoring and control system of claim 9, further comprising an internet-accessible interface usable to perform one or more remote administration tasks from a set of administration tasks consisting of:
associating one or more PCD's with the system;
removing an existing association of one or more PCD's with the system;
listing PCD's associated with the system; and
changing a function relating one or more particular PCD's to limitations on operation of the vehicle.

16. The monitoring and control system of claim 9, wherein the programming instructions are further executable by the processor to receive notification information from the PCD via the data connection and render it via built-in user interface devices of the vehicle.

17. The monitoring, warning, and reporting system of claim 1, wherein the vehicle has a transmission, and wherein:
the programming instructions are further executable by the processor to
search for the PCD; and
connect with the PCD;
the PCD
connects with the processor; and
uses and stores software applications;
the programming instructions are also executable by the processor to monitor the vehicle's transmission; and
the selective monitoring and reporting includes reporting upon operation of the vehicle while the transmission is engaged as a function of the software applications being used by the PCD.

18. The monitoring, warning, and reporting system of claim 1, wherein the programming instructions are further executable by the processor to automatically activate one or more systems of the vehicle upon use of the PCD.

19. The monitoring, warning, and reporting system of claim 1, wherein the trigger event is selected from a trigger class consisting of:
making a non-hands-free phone call using the PCD;
composing a text message on the PCD;
loading any app on the PCD;
opening or using any of one or more apps on the PCD;
pressing a button on the PCD; and
interacting with an activated display on the PCD;
wherein the alarm action comprises sending trigger information about the trigger event to a recipient,
wherein the trigger information comprises one or more of:
a type of trigger event detected,
a GPS location of the vehicle acquired at or around the time of the trigger event;
a sensor reading; and
wherein the recipient is selected from a recipient class consisting of:
an owner of the vehicle,
a parent of a driver of the vehicle,
a fleet operator responsible for the vehicle,
a governmental agency or entity,
an insurance company,
a law enforcement agency,
an operator of a road on which the vehicle was operating at the time of the trigger event; and
an authorized third party.

* * * * *